United States Patent Office

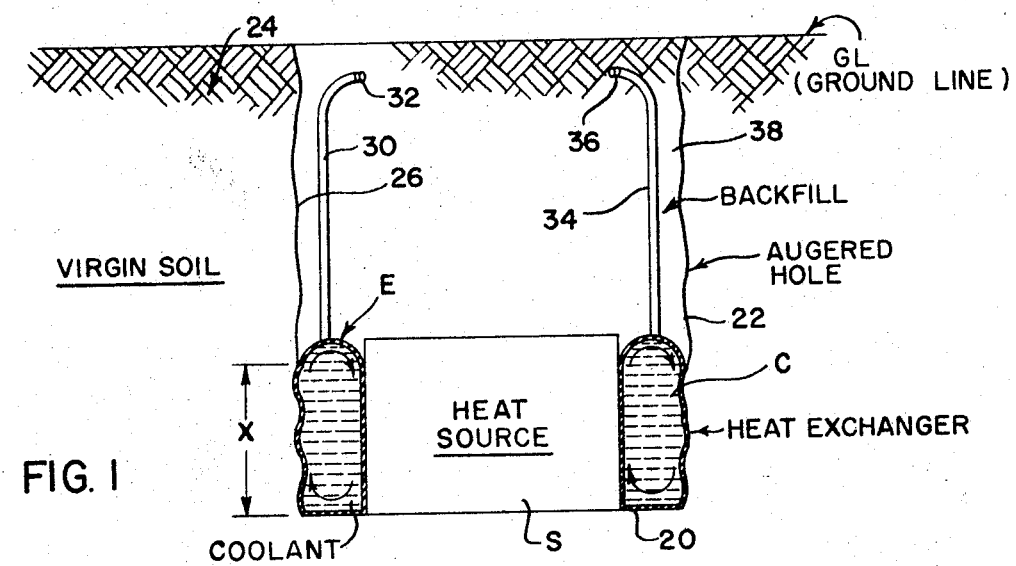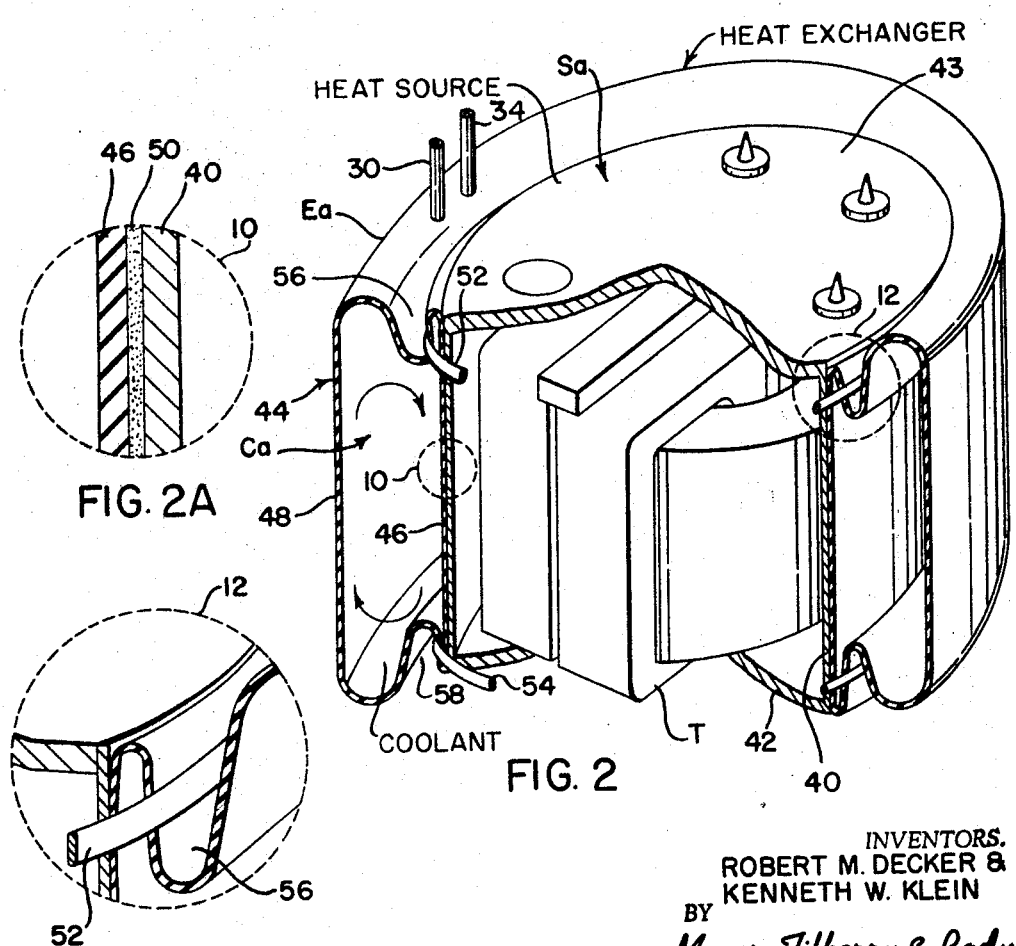

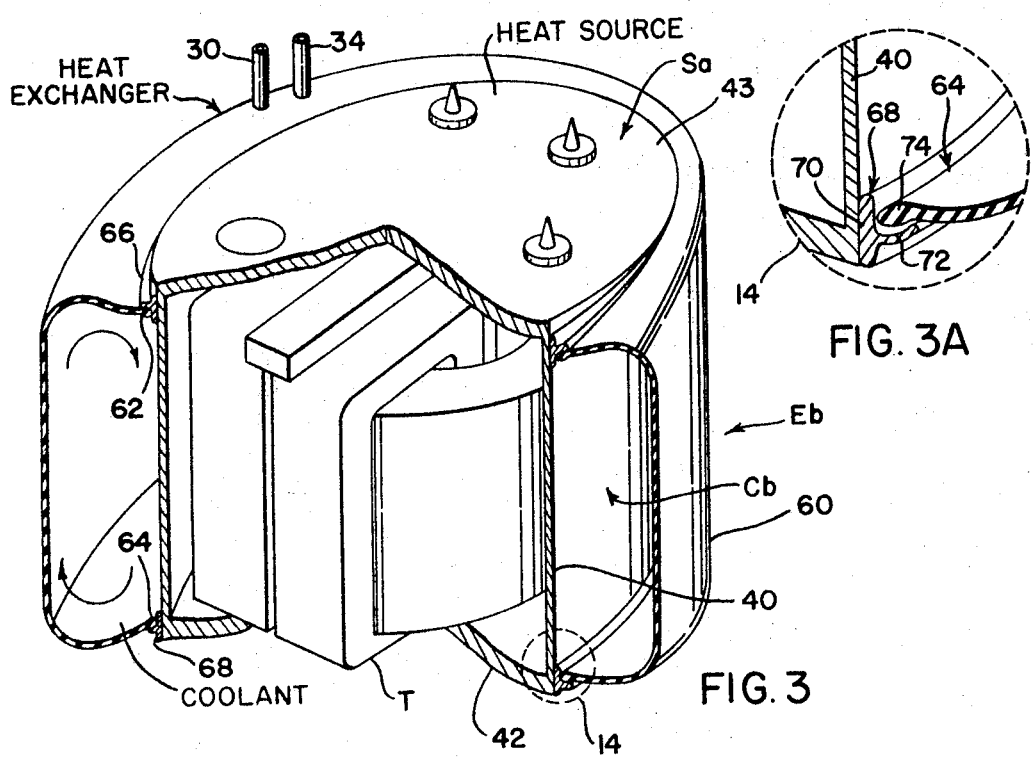
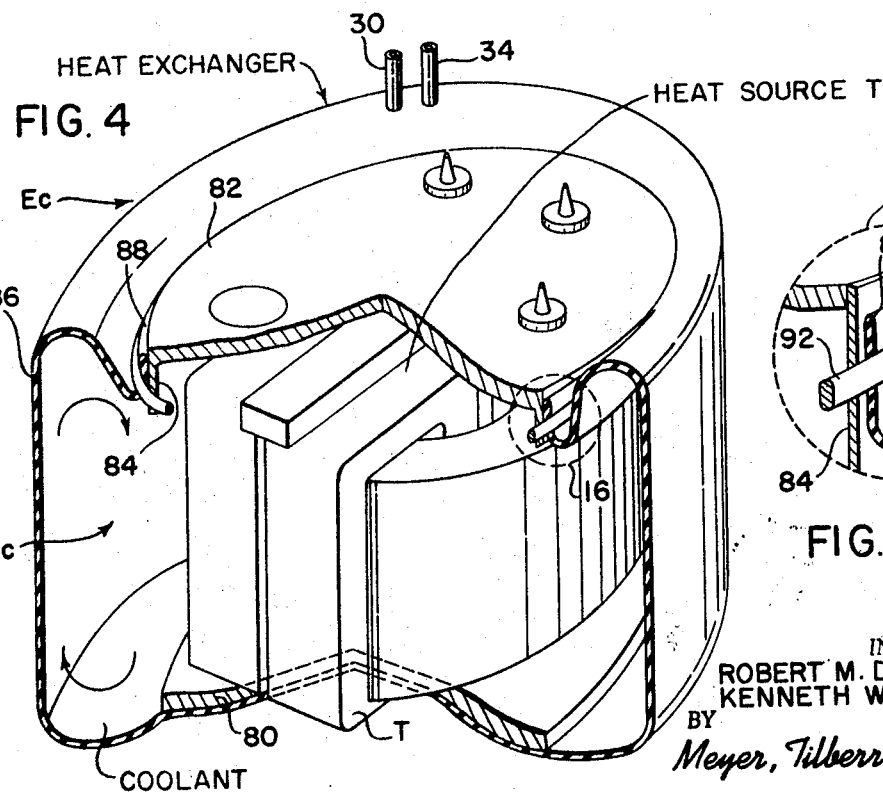

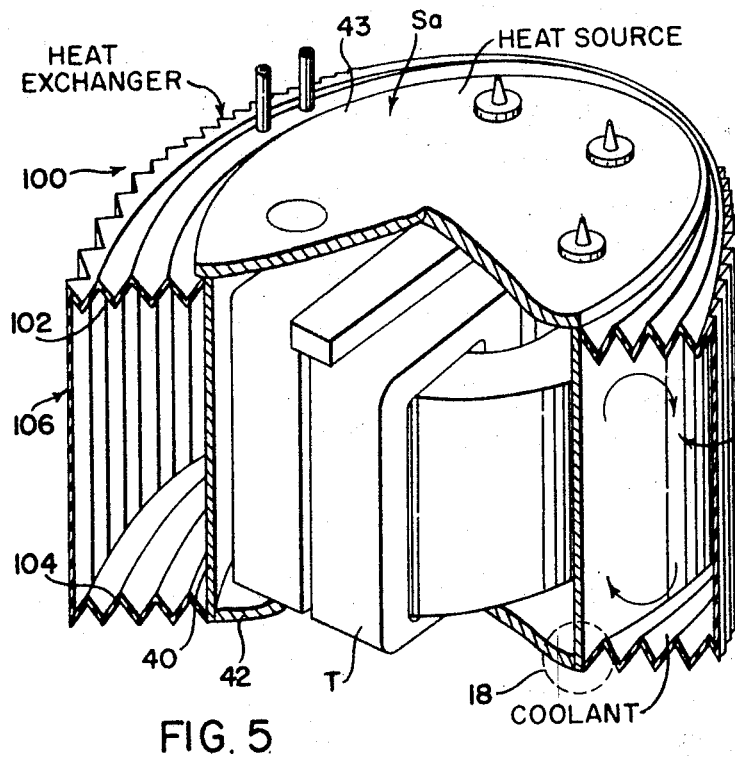
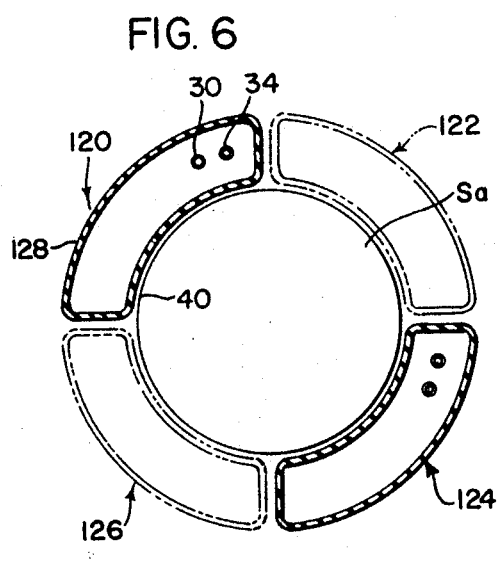
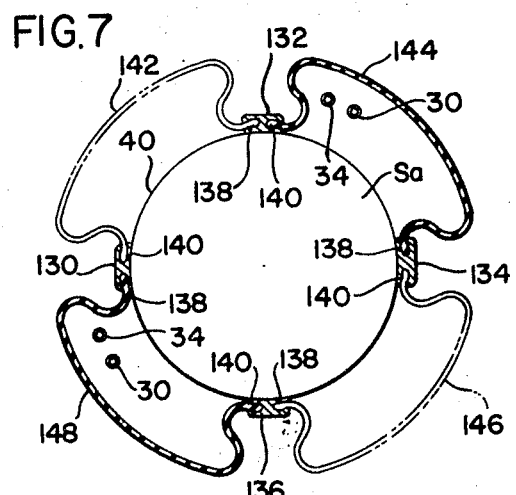

3,461,952
Patented Aug. 19, 1969

---

3,461,952
APPARATUS AND METHOD FOR DISSIPATING HEAT FROM A HEAT SOURCE
Robert M. Decker, Parma, and Kenneth W. Klein, Bay Village, Ohio (both of P.O. Box 5000, Cleveland, Ohio 44101)
Filed Oct. 9, 1967, Ser. No. 673,637
Int. Cl. F28d 21/00; F28f 7/00
U.S. Cl. 165—1       24 Claims

ABSTRACT OF THE DISCLOSURE

Apparatus and method are disclosed herein for dissipating heat from a heat source, such as an electrical transformer, into a heat absorbing medium, such as soil, having irregular shaped walls facing the heat source. The heat exchanger is interposed between the heat source and the irregular shaped walls, and includes flexible means defining an expandable, closed chamber. As the chamber is filled with fluid it expands so that the walls of the exchanger make area surface contact with the irregular shaped walls of the heat absorbing medium and thereby provide a good path for transfer of heat from the source into the heat absorbing medium.

---

This invention is directed toward the art of dissipating heat from a heat source and, more particularly, to apparatus and method for dissipating heat into a heat absorbing medium having irregular shaped walls facing the heat source.

The invention is particularly applicable for dissipating heat generated by an electrical transformer buried in soil below the ground line into the surrounding soil, and will be described with particular reference thereto; although, it is to be appreciated that the invention may be used for dissipating heat from a variety of heat sources, such as buried nuclear electrical generating equipment or a bank of electrical capacitors.

In recent years, power utility companies have given considerable attention to burying electrical transformers in soil, below ground level, rather than mounting the transformers on utility poles. A notable problem, however, when a transformer is so buried, is that some means must be provided to prevent the heat generated by the transformer from shortening the transformer's operating lifetime, which, for example, might be caused by deterioration of electrical insulation. Frequently, a transformer is located within an oil filled, cylindrical shaped transformer casing. The casing is normally constructed of rigid metal. If a hole is dug into virgin earth and the transformer casing is mounted therein, the outer surface of the metal casing will make, at most, only point contacts with the virgin soil. That is, the walls of such a hole are inherently irregular in shape and, hence, the cylindrical surface of the transformer casing will not make intimate surface contact with the irregular shaped walls defining the hole. Therefore, it is difficult to transmit any considerable quantity of heat generated by the transformer into the surrounding soil. When the hole is filled with backfill, the backfill will not return to the condition of virgin soil for many years. Hence, this backfill does not normally have the same heat transfer characteristics as the virgin soil. Even then, after the transformer has been in operation, its casing will expand and contract and, hence, air pockets will develop between the outer surface of the casing and the walls of the surrounding soil, resulting in a loss of heat transmission into the soil. As the quantity of heat that may be dissipated or accepted by the surrounding soil is directly proportional to the surface area of the soil in intimate contact with the outer surface of the casing, the above method of burying a transformer has not met with significant use as there is not sufficient surface area in contact with the casing to permit sufficient heat transfer to maintain a safe operating temperature for a transformer.

One proposal for mounting a transformer below ground level is disclosed in United States patent to R. F. Schrader 3,212,563. By that proposal a transformer together with the transformer casing, is mounted in an oversized tank of water below ground level. The water between the transformer casing and the inner walls of the surrounding tank is circulated, as with pumps, to a nearby reservoir of water located at a residence. This proposal, however, requires considerable use of piping between the residence and the buried transformer. Also, this proposal relies upon the circulation of water to maintain the transformer at a safe operating temperature. Transformer failure may result if the system for providing circulation of the water fails.

The present invention is directed toward apparatus and method for dissipating heat from a heat source, such as an electrical transformer, into heat absorbing medium, such as soil, having irregular shaped walls facing the heat source without the requirement for a liquid circulating system, as has normally been required with previous proposals.

In accordance with the present invention, the heat exchanger is interposed between the heat source and the irregular shaped walls of the heat absorbing medium. This heat exchanger has resiliently expandable walls defining a closed chamber so that when a heat conductive fluid is applied into the chamber it increases in volume so that portions of its outer wall surface make area surface engagement with the irregular shaped walls of the surrounding soil, whereby heat may be readily dissipated through the heat exchanger into the heat absorbing medium.

In accordance with another aspect of the present invention, the closed chamber is defined by a portion of the outer surface of the heat source and the flexible wall means of the heat exchanger which is secured at its peripheral edge to the heat source.

In accordance with a still further aspect of the present invention, the closed chamber is defined by the flexible walls of the heat exchanger.

The primary object of the present invention is to provide a relatively inexpensive means of dissipating heat from a heat source into a heat absorbing medium.

A still further object of the present invention is to provide a heat exchanger for direct buried transformers that does not require means to circulate liquid within the exchanger from a remotely located liquid reservoir.

A still further object of the invention is to provide a heat exchanger having sufficient flexibility that it may be used with a wide range of transformer sizes and augered hole sizes.

A still further object of the invention is to provide a heat exchanger that is capable of making intimate surface contact with both a heat source on one side thereof, as well as irregular shaped walls of an augered hole on the other side.

A still further object of the invention is to provide a heat exchanger that may be easily connected in series with another heat exchanger for greater capacity in transferring heat from the heat source into a heat absorbing medium.

The foregoing and other objects and advantages of the invention will become apparent from the following description of the preferred embodiments of the invention as read in connection with the accompanying drawings in which:

FIGURE 1 is a cross-sectional illustration of a heat source buried in soil;

FIGURE 2 is a perspective view with parts broken away of a first embodiment of the invention;

FIGURE 2A is an enlarged fragmentary view of a portion of FIGURE 2 in the area designated by reference numeral 10;

FIGURE 2B is an enlarged fragmentary view of another portion of FIGURE 2 taken in the area designated by numeral 12;

FIGURE 3 is a perspective view with parts broken away of a modification of the embodiment shown in FIGURE 2;

FIGURE 3A is an enlarged fragmentary view of a portion of FIGURE 3 taken in the area designated by numeral 14;

FIGURE 4 is a perspective view with parts broken away of another modification of the embodiment illustrated in FIGURE 2;

FIGURE 4A is an enlarged fragmentary view of a portion of FIGURE 4 taken in the area designated by numeral 16;

FIGURE 5 is a perspective view with parts broken away of another embodiment of the invention;

FIGURE 5A is an enlarged fragmentary view of a portion of FIGURE 5 taken in the area designated by numeral 18;

FIGURE 5B is a view similar to that of FIGURE 5A, but showing an alternative construction;

FIGURE 6 is a plan view showing another modification of the heat exchanger of the present invention;

FIGURE 7 is a plan view similar to that of FIGURE 6 showing a still further modification of the heat exchanger of the present invention;

Figure 8:
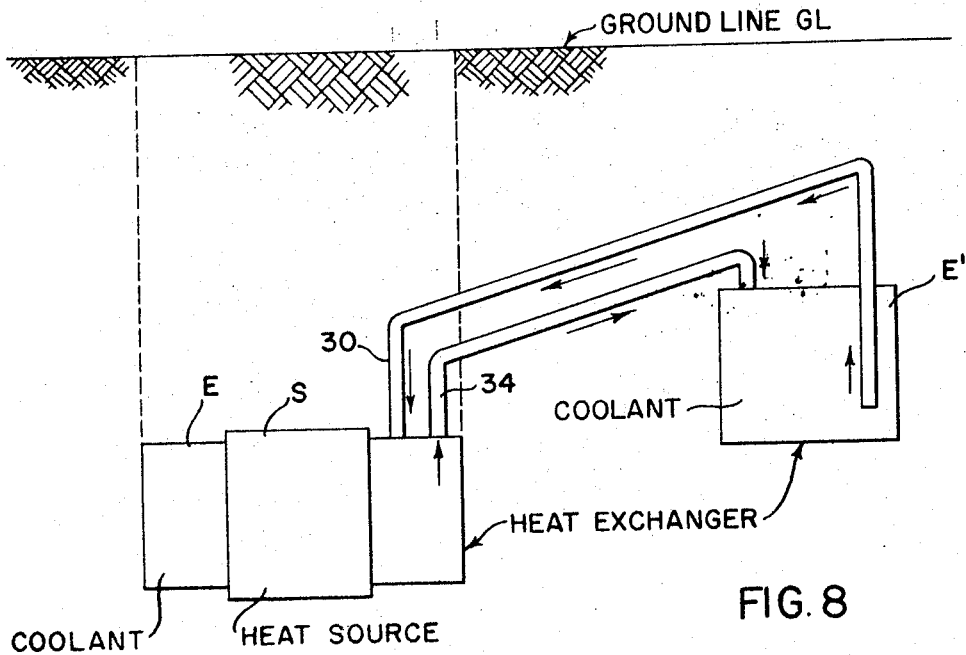
FIGURE 8 is a cross-sectional view similar to that of FIGURE 1 but illustrating an additional heat exchanger to provide greater heat transfer capacity.

Referring now to the drawings wherein the showings are for the purpose of illustrating preferred embodiments of the invention only, and not for the purpose of limiting same, FIGURE 1 illustrates a heat source S resting on the floor 20 of an augered hole 22 in virgin earth 24. The augered hole 22 has side walls 26 which are irregular in shape. Heat source S may take various forms, but, as disclosed herein, is a metal casing having an electrical transformer contained therein. Coaxially surrounding heat source S there is provided a heat exchanger E. This heat exchanger is constructed of flexible elastic material having rubber-like properties, such as a soft plastic. As shown in FIGURE 1, the flexible walls of heat exchanger E define in themselves a closed chamber C of doughnut-like configuration. This heat exchanger coaxially encircles the cylindrical surface of the heat source S. A filler tube 30 provides a conduit for filling chamber C with a heat conductive fluid, preferably water. A cap 32 is provided to close the free end of tube 30. In addition, an exhaust tube 34 is also in communication with chamber C to permit air to be exhausted from chamber C when the chamber is being filled with water. If desired, a cap 36 is provided for closing the free end of tube 34.

After heat source S, together with the surrounding heat exchanger E, has been placed on floor 20 of hole 22, water is supplied through tube 30 to fill chamber C. Accordingly, as the water is applied into chamber C air is exhausted to the atmosphere through tube 34. As chamber C is being filled with water, the resilient walls of exchanger E expand to make intimate surface contact with the outer surface of heat source S as well as with the surface area, for a height indicated by numeral X, of the irregular shaped walls 26 of the augered hole 22. Thereafter, hole 22 is filled with backfill 38. Since a considerable portion of the surface area of heat source S is in intimate contact with the inwardly facing walls of exchanger E, considerable quantity of heat is transferred from the source to the chamber C. Also, since the outer walls of exchanger E make intimate surface contact with the irregular shaped walls 26 of hole 22, a considerable quantity of heat may be transferred through the exchanger into the surrounding virgin soil 24. The volume of the heat exchanger is made directly proportional to the B.t.u. output of heat source S as well as to the B.t.u. acceptance of the surrounding soil. With this construction a transformer, or the like, may be the heat generating element of the heat source and will operate at a safe temperature due to the quantity of heat that is dissipated into the surrounding soil. Although it is preferred to use water as the coolant within heat exchanger E other fluids may be used.

Referring now to FIGURES 2, 2A and 2B, there is illustrated the mechanical details of one embodiment of the invention. As shown in FIGURE 2, a heat source Sa takes the form of a metal transformer casing which contains a typical transformer T. Heat source Sa has cylindrical walls 40 and lower and upper end caps 42 and 43. The upper end cap 43 serves as a typical transformer terminal board. In this embodiment, a heat exchanger Ea includes an endless, flexible wall 44 constructed of soft resilient material, such as plastic. Wall 44 in itself defines a closed chamber Ca. As in the case of the structure shown in FIGURE 1, the heat exchanger is provided with a filler tube 30 as well as an exhaust tube 34. This heat exchanger coaxially surrounds the cylindrical wall 40 of the heat source Sa. Wall 44 includes an inwardly facing wall portion 46 which makes surface contact with cylindrical wall 40 of heat source Sa. Endless wall 44 includes an outer wall portion 48 which is adapted to engage and conform in contour with an irregular shaped wall, such as wall 26 of augered hole 22 in FIGURE 1. As shown in FIGURE 2A, wall portion 46 may be secured to the outer cylindrical surface of wall 40 by an adhesive 50. Alternatively, or in addition, endless wall 44 is secured to source Sa by means of tension straps 52 and 54. These tension straps are located in annular channels 56 and 58 formed in endless wall 44 by bending the wall back upon itself.

Reference is now made to FIGURES 3 and 3A illustrating a modification of the embodiment shown in FIGURE 2. The components in FIGURES 3 and 3A which correspond with those of FIGURE 2 are identified with like character references for simplifying the description of the invention. In the modification of FIGURE 3 a heat exchanger Eb includes a flexible wall 60 constructed of rubber like, synthetic material, such as plastic. Wall 60 is not an endless wall, as in the case of wall 44 in the structure of FIGURE 2. Instead, wall 60 coaxially encircles the cylindrical surface of wall 40 of the heat source Sa, and includes upper and lower peripheral edges 62 and 64 which are secured to wall 40 so that wall 60 and the enclosed surface area of the outer surface of wall 40 define a closed chamber Cb. The edges 62 and 64 are secured to wall 40 by means of a pair of annular rims 66 and 68, secured to and extending radially outward from wall 40. As best shown in FIGURE 3A, rim 68 has a base portion 70 in engagement with the outer surface of wall 40. If desired, rim 68 may be constructed of metal and secured to wall 40, as by welding. A lip portion 72 is curved outwardly and upwardly from base portion 70 to form a pocket for receiving the peripheral edge 64 of wall 60. Preferably, the peripheral edge 64 of wall 60 is enlarged somewhat, as shown at 74, to conform with the pocket defined by base portion 70 and lip portion 72. As chamber Cb defined by wall 40 and wall 60 is filled with liquid, the pressure on the inner surface of wall 60 forces the peripheral edge 64 of wall 60 to engage and be locked into secure engagement with rim 68. If desired, an adhesive may be interposed between the peripheral edge 64 and rim 68. The structural details of the peripheral edge 62 and rim 66 correspond with those discussed above, and require no further discussion herein.

Referring now to FIGURES 4 and 4A, there is shown another modification of the structure shown in FIGURE 2. For purposes of simplifying the description of the invention, those components in FIGURES 2 and 4 which correspond with each other are identified in both the figures with the same character references. In accordance with the aspect of the invention shown in FIGURE 4, the heat source includes only transformer T which may be encapsulated with a plastic coating. However, transformer T, unlike the modification of FIGURES 2 and 3, is not contained within an oil filled outer casing. To permit application of the heat exchanger to transformer T, the transformer is fitted with lower and upper end caps 80 and 82, respectively. These end caps correspond essentially with end caps 42 and 43 of the modification illustrated in FIGURE 2. End cap 82 is circular in shape and has a downwardly extending cylindrical wall 84. The heat exchanger Ec for the modification of FIGURE 4 includes a flexible wall 86 constructed of resilient, rubber like material, such as plastic. As shown in FIGURE 4, wall 86 is somewhat cup-shaped for receiving transformer T and has an annular peripheral edge 88 defining an opening which coaxially surrounds cylindrical wall 84 of end cap 82. The peripheral edge 88 of flexible wall 86 may be secured, as desired, to cylindrical wall 84. However, as shown in FIGURE 4 and FIGURE 4A, flexible wall 86 is bent back upon itself to define an annular U-shaped channel 90 for receiving a tension strap 92. The tension strap 92 serves to tightly secure the peripheral edge 88 to wall 84 of plate 82. In this manner, the outer surface of transformer T together with the inner surface of wall 86 defines a closed, doughnut-shaped chamber Cc for receiving coolant fluid, in the form of water, from filler tube 30, while air is exhausted through tube 34.

Referring now to FIGURE 5, there is shown another embodiment of the invention which is similar to that of the embodiment illustrated in FIGURE 2 and, accordingly, like components are identified in both figures with like reference characters. As shown in FIGURE 5, a transformer T is contained within an oil filled casing defining a heat source Sa. This casing, as in the embodiment of FIGURE 2, has lower and upper plates 42 and 43 interconnected with a cylindrical wall 40. In this embodiment, however, a heat exchanger Ed is defined by an accordion-like member 100 which coaxially surrounds the cylindrical wall 40 to define an expandable closed chamber Cd. Member 100 includes upper and lower, pleated end walls 102 and 104 which permit expansion and contraction in directions radially of cylindrical wall 40. Interconnecting walls 102 and 104 there is provided a circumferential wall 106 which is pleated in the manner illustrated. The pleating of wall 106 permits expansion and contraction of the circumference of wall 106. Member 100 need not be constructed of flexible material, as in the case of the other embodiments illustrated herein, but may be constructed, for example, of metal or relatively rigid synthetics. Expansion and contraction of heat exchanger Ed is provided in an accordion like manner by the pleating of walls 102, 104 and 106. The free ends of end walls 102 and 104 are secured about the lower and upper peripheral edges of the outer cylindrical surface of wall 40. As shown in FIGURE 5A, the lower pleated wall 104 of member 100 is L-shaped at 108 and is received in a channel defined by an L-shaped rim 110 protruding outwardly from wall 40. An alternative construction for securing the free edge of wall 104 to wall 40 is shown in FIGURE 5B, wherein the peripheral edge of wall 104 is L-shaped at 108. A tension strap 111 is received in the channel defined by the L-shaped portion 108 so as to tightly secure the peripheral edge of wall 104 to wall 40. The upper wall 102 of member 106 has its free end secured to wall 40 in the same manner as that discussed above with respect to FIGURES 5A and 5B.

Reference is now made to FIGURE 6 which illustrates another form of the invention, wherein a heat exchanger is defined by an array of four identical modules 120, 122, 124 and 126 which coaxially surround the cylindrical surface of wall 40 of heat source Sa. Each module is elongated in the direction of the axis of symmetry of wall 40 and includes a closed, expandable chamber defined by an endless wall 128 of flexible, rubber-like material, such as plastic. Each module is provided with a filler tube 30 as well as an exhaust tube 34. In use, the heat source Sa may be positioned in an augered hole so that an annular spacing is defined between wall 40 of the heat source and the surrounding irregular shaped wall of the hole. Then, modules 120, 122, 124 and 126 are lowered in an annular array in the space between wall 40 and the wall of the surrounding soil. Thereafter, each module is filled with water until its inner and outer surfaces respectively engage and make area surface contact with a portion of wall 40 as well as with a portion of the surface area of the irregular shaped wall of the soil.

Referring now to FIGURE 7, there is shown a modification of the structure illustrated in FIGURE 6. In this modification, four rims 130, 132, 134 and 136 are secured to and extend longitudinally of the cylindrical surface of wall 40 of heat source Sa. Each rim is provided with slots 138 and 140 for receiving enlarged edges of flexible walls. Four identically formed flexible walls 142, 144, 146 and 148 of flexible, rubber like material, such as plastic, are provided to define four closed chambers. Each of these walls has side edges adapted to be received in longitudinal slots 138 and 140 of a pair of adjacent rims 130 through 136, in the manner shown in FIGURE 7. The end edges, not shown, of walls 142, 144, 146 and 148 may be similarly secured to the outer surface of wall 40.

Referring now to FIGURE 8, there is schematically illustrated a heat source S buried in soil beneath the ground line GL in accordance with any of the previously described modifications of the invention. In this modification, however, filler tube 30 and exhaust tube 34, after the heat exchanger E has been filled with water, are used to couple the heat exchanger E with a secondary heat exchanger E'. The secondary heat exchanger E' may take any suitable form, such as a tank filled with water and buried in soil. Preferably, heat exchanger E' has its outer walls constructed of flexible material so that these walls make intimate surface contact with the surrounding soil. In any instance, the inclusion of secondary heat exchanger E' together with the circulating path permitted by tubes 30 and 34 serves to increase the capacity for transferring heat from source S to the surrounding soil. The cooled water from exchanger E' will flow into exchanger E from tube 30 and force the warmer water in exchanger E to be circulated through tube 34 to exchanger E', where heat is transferred through the walls of exchanger E' to the surrounding soil.

Figures 9, 10:
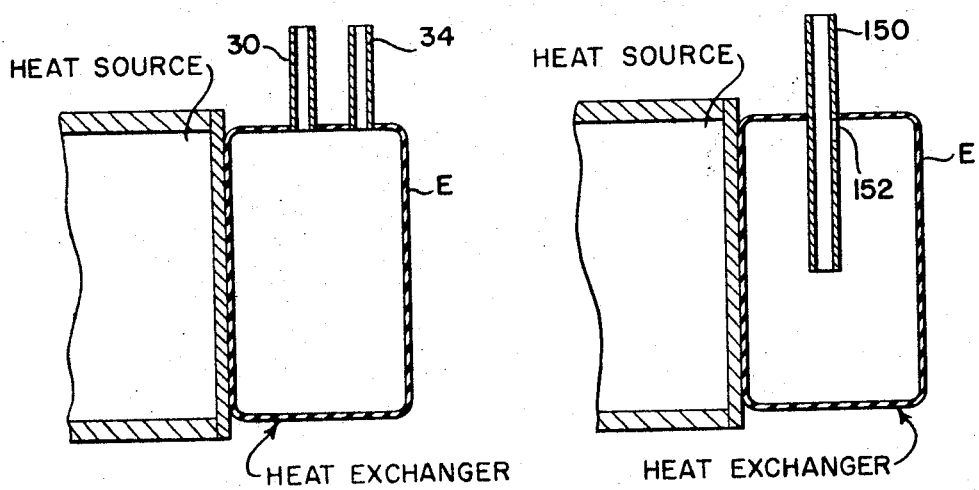
FIGURE 9 is a sectional view illustrating one form of means for applying coolant into the heat exchanger of the present invention and permitting air to be exhausted therefrom.
FIGURE 10 is a view similar to that of FIGURE 9 but showing a modification thereof including a single conduit for filling the heat exchanger with fluid as well as permitting air to be exhausted therefrom.

Referring now to FIGURES 9 and 10, two structures are shown for filling the chamber of a heat exchanger E constructed in accordance with the present invention. As shown in FIGURE 9, two tubes are used including a filler tube 30 and an exhaust tube 34. As discussed previously, as the volume of the closed chamber of the heat exchanger expands, upon being filled with water, the air in the chamber is exhausted through tube 34. Referring now to FIGURE 10, there is shown a modification wherein only a single tube 150 is used in both filling a heat exchanger E with water, as well as permitting exhaustion of air therefrom. Tube 150 extends into the closed chamber, as shown in FIGURE 10, and is provided with an opening 152 adjacent the inner wall of the exchanger. During operation, as the exchanger becomes filled with water, air is forced out through aperture 152 and then upwardly through tube 150.

The invention has been described in connection with particular preferred embodiments, but is not limited to same. Various modifications may be made without departing from the scope and spirit of the present invention as defined by the appended claims.

We claim:

1. In combination:
   an electrical transformer adapted to be received in a hole defined by irregular shaped walls in soil,
   self-contained coolant heat exchanger means adapted to be interposed between said transformer and said irregular shaped walls for dissipating heat generated by said transformer into said soil, said heat exchanger means including wall means secured to said transformer and defining a closed chamber between said transformer and said irregular shaped walls, at least a portion of said wall means being resiliently expandable outwardly from said transformer upon application of fluid under pressure into said chamber so that said portion of said wall means may engage and make area surface contact with said irregular shaped walls.

2. In the combination as set forth in claim 1 wherein said transformer is located within a transformer casing, said wall means of said heat exchanger means being secured at its edges to said casing to enclose at least a portion of the outer surface area of said casing, whereby the enclosed outer surface area of said casing and said heat exchanger wall means define said closed chamber.

3. In the combination as set forth in claim 2 wherein said transformer casing includes rim means for receiving at least a portion of the length of said edges of said heat exchanger wall means.

4. In the combination as set forth in claim 3 wherein said rim means encircles said transformer casing.

5. In the combination as set forth in claim 2 including tension means encircling said transformer casing for tightly securing at least a portion of the length of the edges of said wall means to said transformer casing.

6. In the combination as set forth in claim 1 wherein said transformer is located within a transformer casing, said wall means of said heat exchanger means being disposed outwardly of said casing and defining said closed chamber, and means for securing said wall means to said casing.

7. In the combination as set forth in claim 6 wherein said wall means defines a closed chamber which encircles said transformer casing.

8. In the combination as set forth in claim 7 wherein said securing means includes tension means encircling said wall means for tightly securing said wall means to said transformer casing.

9. In the combination as set forth in claim 8 wherein said transformer casing is substantially cylindrical and said wall means defines said chamber so as to coaxially encircle the outer cylindrical surface of said transformer casing.

10. In the combination as set forth in claim 9 wherein at least a portion of said wall means is of resilient material so as to engage and conform in surface contour with the irregular shaped walls of said soil, and means for supplying coolant fluid into said chamber for expanding same whereby said resilient wall portions may engage and make area surface contact with said irregular shaped walls.

11. A method of dissipating heat from a heat source into a heat absorbing medium having irregular shaped walls spaced from and facing said heat source and comprising the steps of:
   providing a heat exchanger having walls defining a closed chamber and width at least a portion of said walls being resiliently expandable outwardly upon application of fluid under pressure to said chamber;
   positioning said heat exchanger between said heat source and said irregular shaped walls so that expansion of said volume causes opposing wall portions of said exchanger to engage said heat source and said irregular shaped walls; and
   applying heat conductive fluid into said chamber at sufficient pressure until at least a portion of the walls of said exchanger engage and make area surface contact with said irregular shaped walls so that said exchanger becomes a self-contained coolant exchanger, whereby heat may be dissipated from said heat source through said exchanger and into said heat absorbing medium.

12. A method of dissipating heat from a heat source into a heat absorbing medium having irregular shaped walls spaced from and facing said heat source and comprising the steps of:
   providing a self-contained coolant heat exchanger having walls defining a closed chamber, at least a first portion of said walls adapted to make area surface contact with said heat source, and at least a second portion of said walls being resiliently expandable away from said first portion in response to application of fluid under pressure to said chamber, said second portion being sufficiently flexible to make area surface contact with at least a portion of the surface area of said irregular shaped walls;
   positioning said heat exchanger between said heat source and said irregular shaped walls so that said first wall portion faces said heat source and said second wall portion faces said irregular shaped walls; and
   applying a sufficient volume of heat conductive fluid into said chamber to expand said heat exchanger so that said first and second wall portions respectively make area surface contact with said heat source and said irregular shaped walls, whereby heat from said heat source is transferred through said exchanger into said heat absorbing medium.

13. A method of dissipating heat from a heat source into a heat absorbing medium having irregular shaped walls spaced from and facing said heat source and comprising the steps of:
   securing a resiliently expandable wall means to at least a portion of said heat source to define a self-contained coolant closed chamber therebetween with said chamber located between said heat source and said irregular shaped walls; and
   applying heat conductive fluid under sufficient pressure to cause at least a portion of said wall means to expand outward toward and make area surface contact with at least a portion of said irregular shaped walls so that heat from said heat source may be transferred through said chamber to said heat absorbing medium.

14. In combination:
   a heat source;
   a self-contained coolant heat exchanger for dissipating heat from said source into a heat absorbing medium having irregular shaped walls facing said heat source, said heat exchanger being located between said heat source and said heat absorbing medium;
   said heat exchanger having wall means for defining a closed chamber between said heat source and said irregular shaped walls, at least a portion of said wall means being resiliently expandable outwardly toward said irregular shaped walls upon application of fluid under pressure to said chamber; and
   means for supplying fluid into said chamber for expanding said wall means so that a portion of said wall means may make area surface contact with said irregular shaped walls.

15. In the combination set forth in claim 14 wherein said heat exchanger wall means is constructed of flexible resilient material to permit expansion of said closed chamber upon application of fluid under pressure into said chamber.

16. In the combination set forth in claim 14 wherein said wall means is secured adjacent its peripheral edges to said heat source to define said closed chamber therebetween.

17. In the combination set forth in claim 14 wherein said heat source is a closed container having heat generating means located therein.

18. In the combination set forth in claim 17 wherein said wall means is tightly secured to said container.

19. In the combination set forth in claim 17 wherein said wall means in itself defines said closed chamber.

20. In the combination set forth in claim 17 wherein said wall means defines said closed chamber so as to encircle said container.

21. In the combination set forth in claim 17 wherein said wall means has peripheral edges in engagement with said container, and means for tightly securing said peripheral edges to said container so that said closed chamber is defined by said wall means, said peripheral edges and at least a portion of the outer surface area of said container.

22. Apparatus for dissipating heat generated by a heat source into a heat absorbing medium having irregular shaped walls defining a hole for receiving said heat source, said apparatus comprising:
a self-contained coolant heat exchanger secured to at least a portion of said heat source and having walls defining a chamber, at least a portion of said heat exchanger walls being expandable, under pressure, to expand outwardly from said heat source to engage irregular shaped walls of a said hole in a heat absorbing medium; and
means for supplying heat conductive fluid into said chamber to cause said portion of said heat exchanger walls to expand sufficient for engaging said irregular shaped walls so that a substantial surface area of said exchanger may engage a corresponding surface area of said irregular shaped walls to facilitate transfer of heat from said heat source to said heat absorbing medium.

23. A self-contained coolant heat exchanger for dissipating heat from a heat source into a heat absorbing medium having irregular shaped walls facing said heat source wherein said heat exchanger includes flexible wall means defining a closed chamber, said wall means having at least a portion thereof exhibiting resilient characteristics so as to permit expansion of said closed chamber in response to application of fluid under pressure into said chamber, means for supplying fluid into said chamber to expand said chamber so that at least a portion of the outer surface area of said wall means may engage and make area surface contact with a said irregular shaped wall of a heat absorbing medium, and means for permitting exhaustion of air from said chamber.

24. A heat exchanger as set forth in claim 23 including means for connecting said exchanger with an external heat sink.

References Cited

UNITED STATES PATENTS

| | | | |
|---|---|---|---|
| 2,625,804 | 1/1953 | Patch et al. | 165—46 |
| 3,212,563 | 10/1965 | Schrader | 165—45 |
| 3,216,492 | 11/1965 | Weaver | 165—46 |

ROBERT A. O'LEARY, Primary Examiner

CHARLES SUKALO, Assistant Examiner

U.S. Cl. X.R.
165—45, 46, 47, 86